July 31, 1928.
R. EHRENFELD
1,678,852
TERMINAL COVER
Filed Dec. 2, 1922
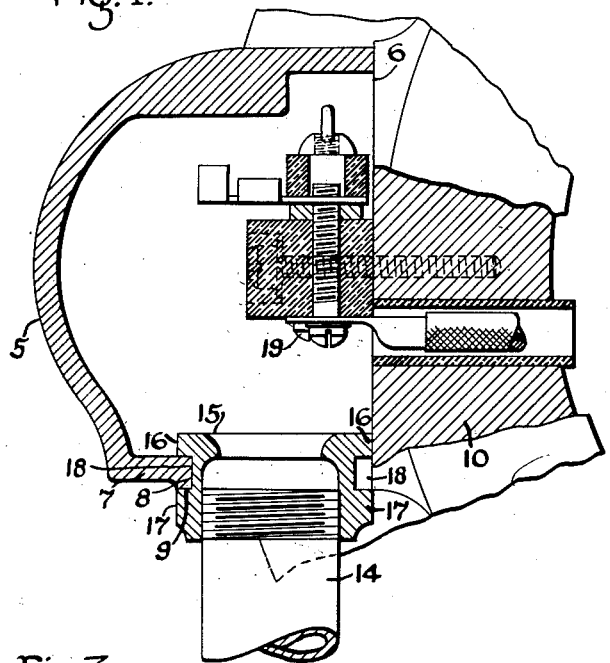
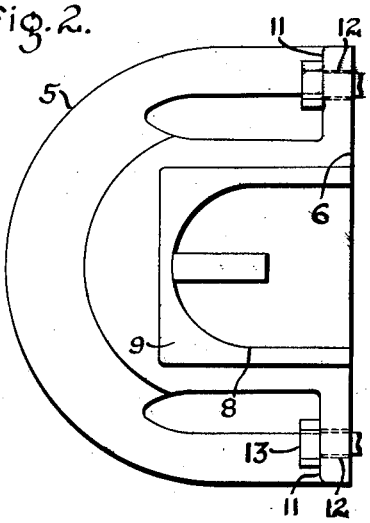
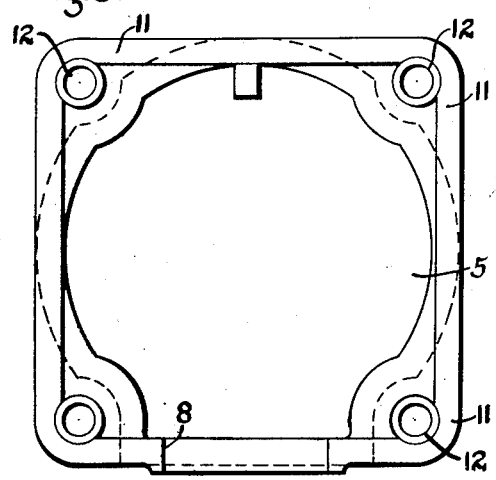
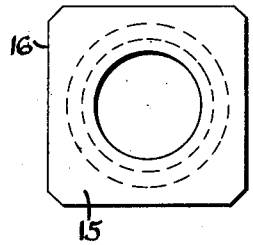
WITNESSES:
R. J. Butler
J. H. Tending
INVENTOR
Ralph Ehrenfeld.
BY
Wesley G. Carr
ATTORNEY Patented July 31, 1928.

1,678,852

UNITED STATES PATENT OFFICE.

RALPH EHRENFELD, OF EAST PITTSBURGH, PENNSYLVANIA, ASSIGNOR TO WESTINGHOUSE ELECTRIC & MANUFACTURING COMPANY, A CORPORATION OF PENNSYLVANIA.

TERMINAL COVER.

Application filed December 2, 1922. Serial No. 604,572.

My invention relates to terminal covers and particularly to covers for enclosing the terminals of generators and motors.

One object of my invention is to provide a terminal cover having an open face that is secured to a generator or motor frame and which is provided with a bottom wall, having a slot therein for receiving a flanged conduit bushing, which serves to prevent displacement of the conduit or bushing when the cover is in operative position.

Another object of my invention is to provide a terminal cover that interlocks with the conduit bushing previously applied to the conduit when the cover is secured to the motor or generator frame.

Another object of my invention is to provide a terminal cover that may be made of cast metal or pressed metal that requires a minimum amount of finishing after the casting or pressing operations and which is adapted to receive a cast metal conduit bushing.

A further object of my invention is to provide a terminal cover that is inexpensive to manufacture and which may readily be assembled.

These and other objects, that will be made apparent throughout the further description of my invention, are attained by means of the apparatus hereinafter described, and illustrated in the accompanying drawings, wherein:

Figure 1 is a vertical section through the terminal cover applied to a generator frame, showing the terminals enclosed by the housing together with the conduit and bushing;

Fig. 2 is a bottom plan view of the cover shown in Fig. 1;

Fig. 3 is an elevational view of the cover shown in Fig. 1, and

Fig. 4 is a plan view of the conduit bushing shown in Fig. 1.

Referring to the drawings, the cover comprises a metal casing 5 having an open side portion 6 and a bottom portion 7 disposed at right angles thereto that is provided with a slot 8 which extends inwardly from the open side of the casing. The bottom wall surrounding the slot 8 is of greater thickness than the remainder of the wall and constitutes a flat seat 9 for receiving a conduit bushing, to be hereinafter described.

The open side 6 of the casing is provided with flanges 11 having perforations 12 therein through which attaching bolts 13 extend into tapped holes in the motor or generator frame 10.

The conduit 14, which contains the conductors of the generator or motor, is provided with a threaded bushing 15 having flanges 16 and 17 spaced apart to provide grooves 18 therebetween of slightly greater width than the thickness of the seat 9. Therefore, the bushing may be attached to the casing 5 by sliding the bushing into the slot 8, the flanges serving to prevent longitudinal movement of the bushing. When the cover is in assembled position upon the generator or motor frame 10, the bushing cannot be withdrawn from the groove and, therefore, lateral displacement of the bushing is prevented by the motor or generator frame 10.

In order to assemble the various parts, the bushing is first secured upon the threaded end of the conduit and placed beneath the terminals 19 in the position indicated in Fig. 1. The casing 5 is then moved toward the frame in such manner that the edges of the slot 8 engage between the flanges of the bushing. The bolts 13 are then screwed in place.

The casing affords a simple and secure means for attaching the conduit bushing to the motor frame. While I have indicated, in the drawings, a casing made of cast metal, it is obvious that the construction of the casing is such that it may be economically drawn or pressed from sheet metal.

While I have illustrated and described but one embodiment of my invention, it will be apparent to those skilled in the art that various modifications, changes, substitutions, additions and omissions may be made therein without departing from the spirit and scope of my invention, as set forth in the appended claims.

I claim as my invention:

1. The combination with a terminal cover having an open side and having means whereby the open side may be secured to a support for enclosing a terminal thereon and having a slot in a side wall thereof extending inwardly from the open side of the cover, of a conduit bushing having flanges thereon for engaging the edge portions of the slot when the cover is in operative position for preventing longitudinal displacement of the bushing with respect to the cover.

2. The combination with a terminal cover having an open side and having means whereby the open side may be secured to a support for enclosing a terminal thereon and having a slot in a side wall thereof extending inwardly from the open side of the cover, of a conduit bushing having flanges thereon for engaging the edge portions of the slot and removable therefrom only through the open side of the cover.

3. The combination with a terminal cover having an open side and having means whereby the open side may be secured to a support for enclosing a terminal thereon and having a rectangular slot in a side wall thereof extending inwardly from the open side of the cover, of a conduit bushing provided with a rectangular portion having flanges thereon for engaging the edge portions of the slot when the cover is in operative position for preventing rotation or displacement of the bushing with respect to the cover.

In testimony whereof, I have hereunto subscribed my name this 27th day of November, 1922.

RALPH EHRENFELD.